INVENTOR
MARIUS PIOT

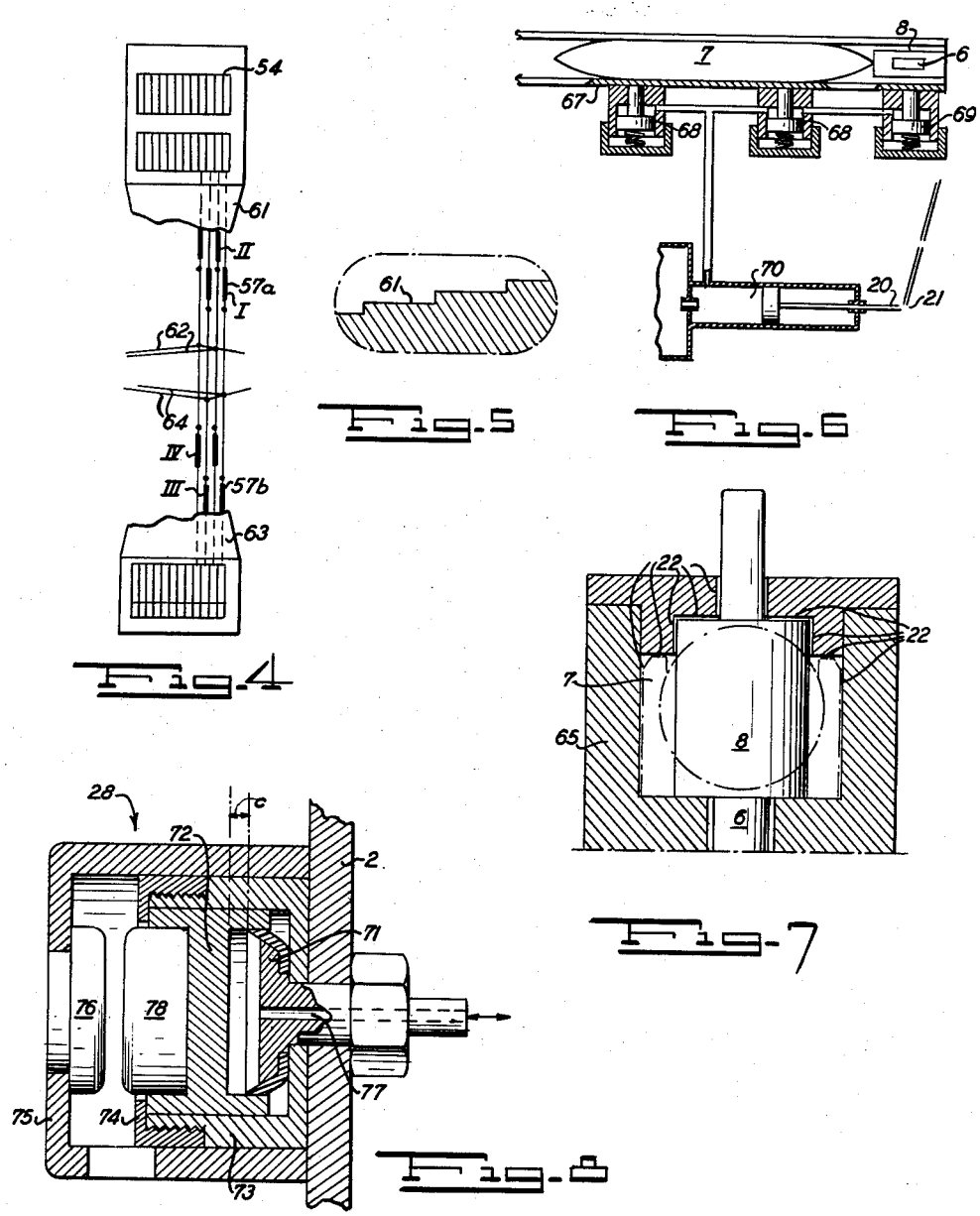

INVENTOR
MARIUS PIOT

INVENTOR

MARIUS PIOT

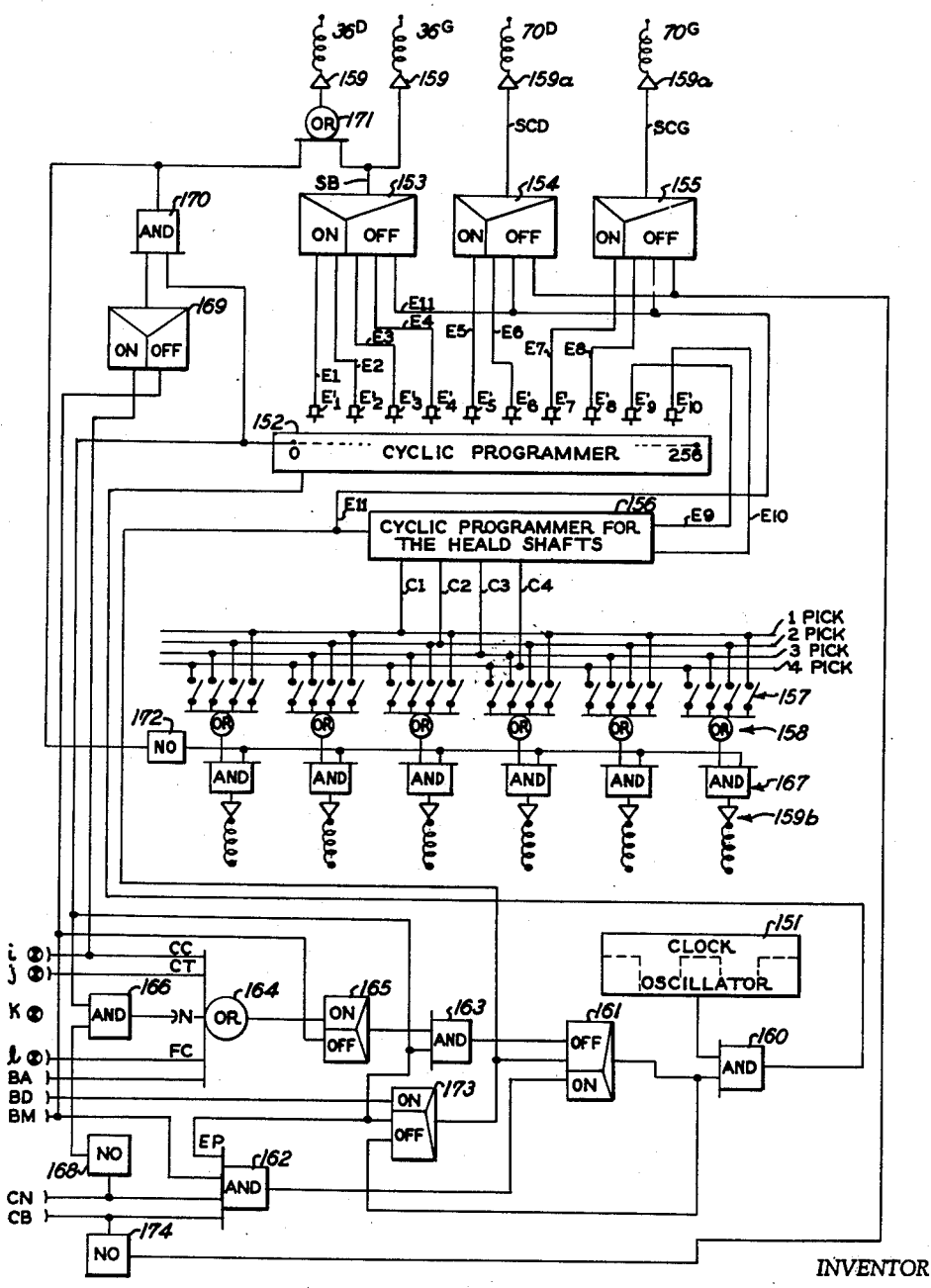

3,191,633
PNEUMATIC CONTROL FOR THE MAIN RECIPROCATORY MOVEMENTS OF A LOOM
Marius Piot, Roanne, France, assignor to Ateliers Diedericks, Bourgoin (Isere), France, a corporation of France
Filed Feb. 7, 1962, Ser. No. 171,659
Claims priority, application France, Feb. 10, 1961, 41,217, Patent 1,289,594; Jan. 8, 1962, 42,171
6 Claims. (Cl. 139—11)

The present invention relates to a loom or weaving frame operating through the agency of shuttles and improved through the following features:

The nature of the driving power resorted to for ensuring the three main reciprocatory movements, to wit: that of the reed carrier, the movement of the shuttle and the shifting of the heald shafts;

The absence of any permanently rotating shaft or the like member;

The securing of the shuttle boxes on the loom body without said boxes taking part in the movements of the reed carrier;

The movements of the reed carrier between said stationary boxes;

The holding fast of the reed carrier in its rearmost position during the passage of the shuttle out of one shuttle box into the other;

The holding fast also in a stationary position of the heald shafts actuating the sheets of warp threads throughout the time elapsing between the entrance of the shuttle inside the shed and its passage out of the latter;

The arrangement of an electric or electronic circuit for the timing and the control of various operations of the loom;

The arrangement, in the case of an electric control, of an electric distributor actuated by a miniature synchronous motor providing the required sequence of the different operations;

The provision of means checking whether the shuttle is present at the bottom of its box or otherwise, with an instantaneous stoppage of the loom in the case of any lag;

The provision of control means for the heald shafts no longer requiring any adjustment of the sheets of warp threads;

The control means for the heald shafts are located inside a casing positioned above said heald shafts and between the two sections of the loom without outwardly projecting; and The arrangement of the damping means for the shuttle driving sword as obtained by a gasiform fluid, of which the pressure, when subjected to the shock of the sword, may increase speedily and rise considerably above that of the supply.

According to a principal feature of the invention, the three chief movements of a weaving frame, to wit: (a) the reciprocation of the reed carrier; (b) the reciprocation of the shuttle; (c) the reciprocation of the heald shafts actuating the warp threads, are obtained by a compressed gasiform fluid acting directly on corresponding pistons.

This results in the cutting out of almost all the rotary mechanical parts resorted to usually, in particular the two main shafts, their gears, cams, the connecting rods and the like.

One of the main advantages of the improved loom consists in that it is possible to obtain a high speed for the reed carrier at the moment of the insertion of a pick into the fabric and further advantages are also obtained through the use of a compressed gasiform fluid as a source of driving power, said further advantages including inter alia: the cutting out of the abutments, an increase of the acceleration of the shuttle when beginning its movement, the adjustment of the duration of movement of the heald shafts within a very large range and, generally speaking, a smooth operation, a great adaptability and ease of operation, an easy transformation of the movements without any substantial loss of energy, easy and speedy transmissions and the like.

In known mechanical weaving looms, provided with a shuttle or otherwise, the movement of the reed inserting the pick takes part in a rotary movement under the action of a rotary shaft, which rotary shaft transforms, through the agency of cranks or cams, its rotary movement into the desired reciprocating rectilinear or curvilinear movement.

In all cases, at the moment at which the reed reaches the bottom of its forward stroke, its speed is zero; consequently, the work produced is also zero and, theoretically, it would be impossible to insert the weft threads between the warp threads. Now, in practice, the reed meets the pick to be inserted slightly before the end of its stroke, by reason of the presence of the preceding picks which are urged forwardly by the reed without being actually hit by the latter. Said engagement between the last pick and the reed is obtained all the earlier when the fabric is closer, the warp is thicker and the insertion is more difficult by reason of the nature of the threads.

Consequently, when the reed meets the last pick, it is still bestowed with a certain speed, which leads to an actually efficient work. It will however be readily understood that it is not possible to control said speed, which matches automatically the minimum sufficient amount of work required by actually positioning the last pick at the point where the reed assumes said speed. Between said point and the front idle terminal point, the fabric is therefore urged back, according to the case by 0 to 5 mm. and even more, which leads to substantial difficulties for correctly maintaining the fabric breadthwise and keeping it tensioned.

Thus, for instance, it may be mentioned that for a frame revolving at 166 r.p.m., of which the reed meets the pick to be inserted at 3 mm. ahead of the idle point, the speed of the reed is equal to 0.34 m./sec.; at 1 mm. it is equal to 0.20 m./sec. at 0.5 mm., to 0.14 m./sec. and at 0.1 mm., it is equal only to 0.06 m./sec.

In order to produce the required work, it is therefore necessary to increase the weight of the reed-carrying system and the consequences of this increase in weight are all the more serious when the speed of the loom is greater, as far as the power absorbed, the vibrations, the wear, the impact against the stops and the like are concerned.

According to the present invention, the reed carrier is subjected to a pneumatic pulse and reaches a final speed which is comparatively high at the moment of the insertion of the pick, and said speed increases in value when the pressure of the gasiform fluid used is higher.

On the other hand, the total energy stored by the reed carrier serves for the insertion of the pick, whereas in the case of a loom wherein the reed carrier is controlled by cranks or cams, a large fraction of the energy is absorbed by passive resistances arising through the slowing down of the moving masses.

According to the invention, the three above-mentioned chief movements are related as follows:

The shuttle boxes being secured to the loom body are stationary with reference to the reed carrier;

The shuttle passes from one box to the other, while the reed carrier is held fast in its rearmost position;

The reed carrier moves speedily from rear to front, inserts the picks and returns immediately into its stationary rear position;

The heald shafts remain stationary during the passage of the shuttle out of one box into the other;

The heald shafts cross each other during the reciprocation of the reed carrier, so that they are perfectly stationary during the passage of the shuttle which never touches the threads of the upper warp sheets.

According to a further object of the invention, the three main safety checking operations governing the work of a loom, to detect: the presence of the shuttle during a predetermined time in either of the two shuttle boxes, the presence of the weft threads, the presence of all the warp threads, are started by electric switches, of which some are actuated directly by the shuttle and the others by the cam of an electric distributor. The combination of said switches is such that if the shuttle does not reach the shuttle box at the desired moment or if the weft thread is broken or exhausted, or again, if one of the stop knobs has been depressed, the loom stops immediately in the position corresponding to the end of the travel of the shuttle, whether real or expected, that is with the reed held in its rearmost position in alignment with the shuttle boxes and the warp threads open at the present pitch of the shed, through which the shuttle has just passed. In the case of a stoppage produced by the breaking of one or more warp threads, the loom stops with the shuttle in its right-hand or left-hand box, the heald shafts in their inoperative position and the batten to the front.

These results are obtained without break, without any stops, without any mechanical straining at the exact moment at which all the parts of the loom are stationary during the interval separating the arrival of the shuttle into one of the shuttle boxes from the starting of the reed-carrier.

The electric switches provided for these three safety systems are inserted in an electric circuit which, during operation, holds closed a relay which feeds a miniature motor driving the distributor cams.

When one of the three safety systems is operative, the relay circuit is switched off, the motor is at a standstill and the loom stops in the position referred to with the shuttle in its right-hand or left-hand position, according to the moment at which the safety system has operated. The case is the same with the stop knobs; the right-hand stop knobs produce the stoppage of the loom in the same above referred to position with the shuttle on the right hand side, while those on the left-hand side produce a similar stoppage with the shuttle in its left-hand box.

The re-starting may be obtained through any starting knob, but it is possible only if all is in order, including the warp and weft threads.

Each of the pneumatic driving means which actuate respectively the reed-carrier, the shuttle and the heald shafts, is controlled by an electric distributor defining the speed of operation, and the accurate sequence of the different movements.

Said distributor includes a miniature synchronous electric motor driving a shaft carrying rigidly three cams, of which one controls the reed carrier, one the shuttle and one the heald shafts, the notches of said cams acting on miniature switches, which close each, at the desired moment and during the time required, the circuit of the electromagnet provided for each pneumatic driving means.

Each electromagnet actuates a pneumatic valve which provides for the admission of the compressed gasiform fluid into the driving cylinder when the electromagnet circuit is closed, whereas, when the latter is opened, the driving cylinder is connected with the exhaust.

Each of the miniature switches actuated by the distributor cams is adjustable, so that it is possible to modify the time during which the corresponding electromagnet circuit is to be closed, which allows modifying the energy fed to and the speed of the piston in each of the driving means. A further adjustment allows also timing the operation of the miniature switches with reference to one another, whereby the shuttle may be started with a lag or a lead with reference to the beginning or end of the travel of the reed carrier, or reversely.

It is also possible to time the crossing point of the heald shafts with reference to the movement of the reed carrier and with reference to the travel of the shuttle.

According to a further embodiment of the invention, the above-described electromechanical control system is replaced by a static electronic equipment which is specially designed for this type of loom and executes exactly the same operations, but the rhythm and duration of the electric pulses produced, are defined in a more reliable, more speedy and more accurate manner, without any misadjustment to be feared.

The electromagnet controlling the different driving means of the loom and also the control members such as the stopping and starting knob, which are located preferably on either side of the loom, the warp protector, the weft fork, the means checking the presence of the shuttle in the boxes, the means checking the presence of the reed carrier in its rearmost position before the starting of the shuttle and the like, are retained without any modification. Instead of being connected with miniature control switches, they are merely connected with cyclic programmers.

A comparison between these two sorts of control systems may be made substantially as follows, reference being made to the wiring diagram forming FIG. 13 of the accompanying drawings.

The miniature motor is replaced by an electronic clock or oscillator;

The set of cams is replaced by a cyclic programmer; and

The miniature switches associated with auxiliary relays are replaced by electronic circuits, producing, according to Boole's algebraic symbols, the conventional logical functions "AND," "NO," "OR," "MEMORIES" and the like.

The invention will be readily understood, reference being made to the accompanying drawings, given by way of example, and illustrating a preferred embodiment thereof.

In said drawings:

FIG. 4 is a side view thereof.

FIG. 5 illustrates, on a larger scale, one of the stepped stops for the heald shafts.

FIG. 6 is a view, from above, of the brakes provided for the shuttle and for the picker.

FIG. 7 illustrates endwise the means guiding the shuttle in one of the shuttle boxes.

FIG. 8 illustrates the brake engaging one side of the reed carrier.

FIG. 16 is an electronic wiring diagram of a substitute for the electromechanical wiring diagram in the lower section of FIG. 13.

Figure 1:
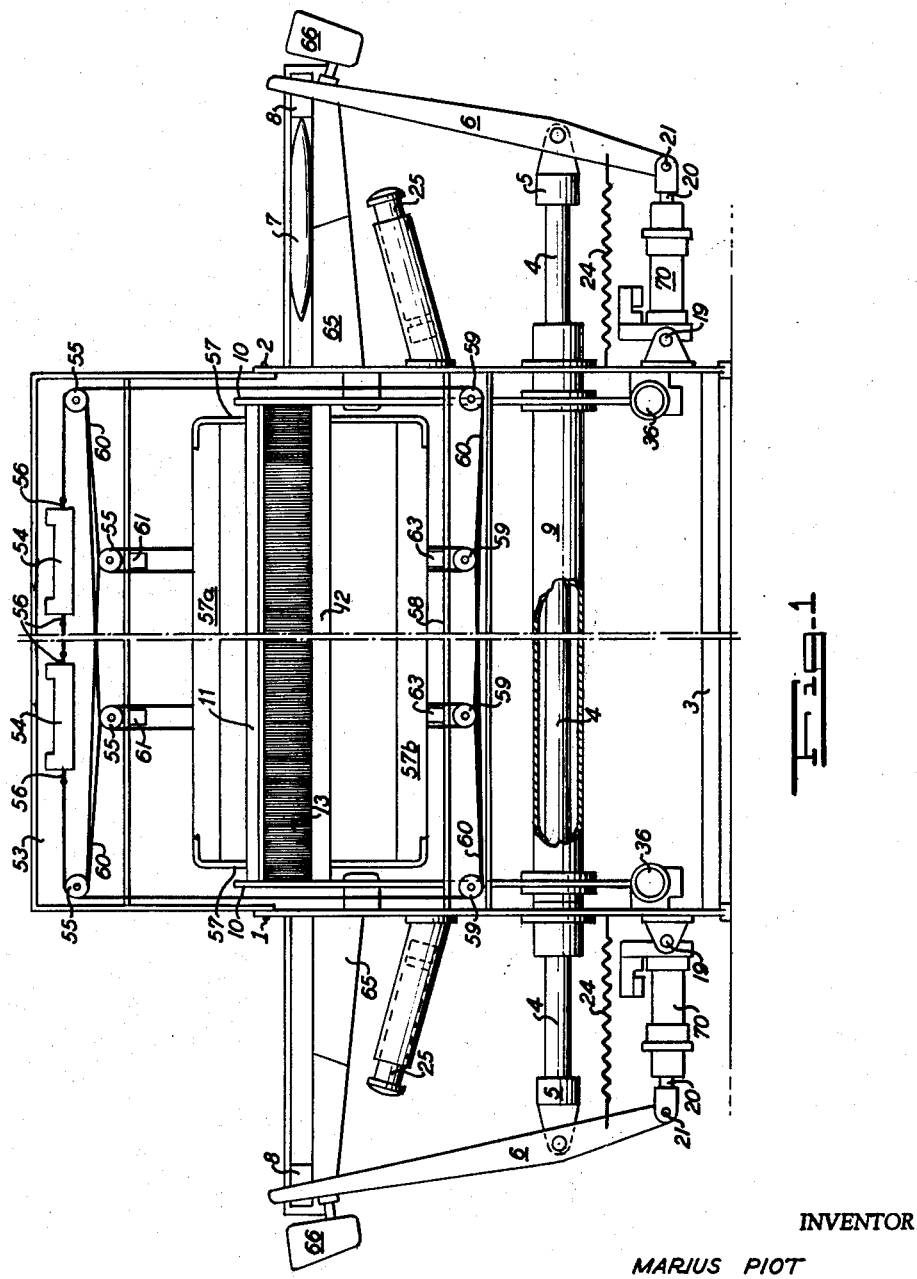
FIG. 1 is a diagrammatic elevational front view showing the loom as a whole.

FIG. 1 shows the loom as a whole, which loom includes two sections 1 and 2 interconnected by stays 3. A stationary shaft 4 extends through said sections and carries at each end a socket 5 to which is pivotally secured the picking stick 6 acting on the shuttle 7 through the picker 8. Between the loom sections 1 and 2, a reed carrier constituted by a tubular stay 9 is revolvably carried on said shaft and rigidly interconnects two struts 10.

To the upper end of the struts are secured the upper support 11 and the lower support 12 for the reed 13. The lower support also form a race for the shuttle.

Figure 2:
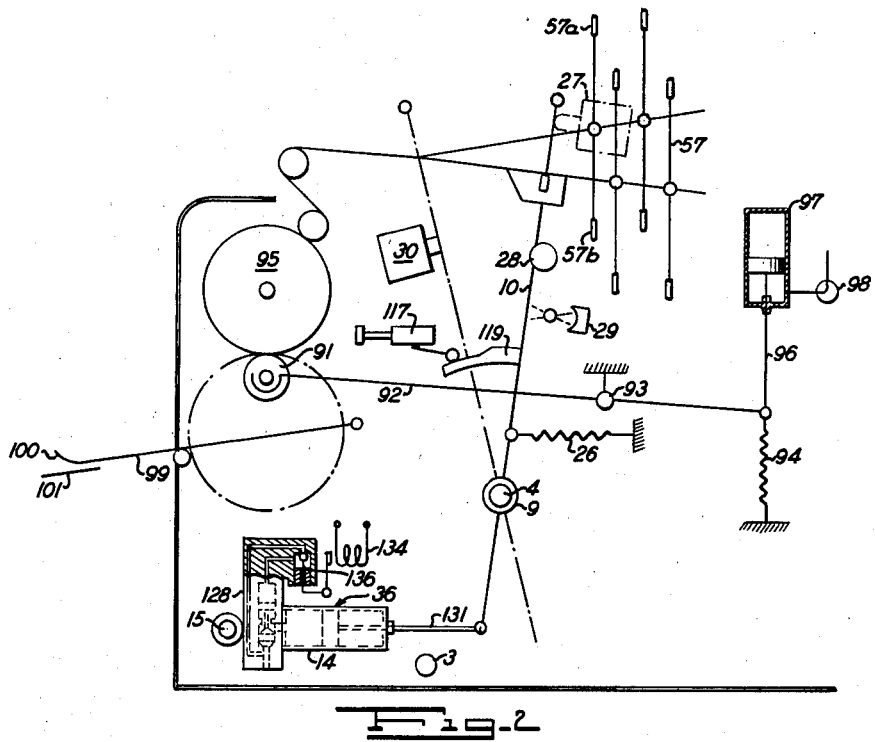
FIG. 2 is a diagrammatic transverse sectional view of the loom.

To the lower end of each strut 10 (FIGS. 1 and 2) are secured the driving means 36 including a piston carrying a rod 131 and adapted to move inside a cylinder 14 secured to the front of the loom and pivotally carried by a spindle 15. The rearward movement of the reed carrier into the position of stoppage required, which allows the passage of the shuttle from one shuttle box to the other, is obtained either by springs 26 as illustrated in FIG. 2, or else, by double-acting pistons (not shown) in the two driving means provided for the reed carrier.

Outside each loom frame section (FIG. 1), further driving means 70 similar to those referred to hereinabove, include a cylinder pivotally secured to the frame body through a spindle 19, while its piston rod 20 is pivotally secured at 21 to the end of the picker rod 6. The return of the picker rod is ensured by a spring 24.

The movement of the heald shafts 57 is ensured by a mechanism enclosed in an upper closed casing 53 (FIGS. 1 and 3) inside which are carried driving means 54, transmission pulleys 55 and yielding elastic cables 60 secured, on the one hand, to the ends of the piston rods 56 of said driving means and, on the other hand, for some of them, to the upper sections 57a of the heald shafts 57.

Between the sections of the loom frame and underneath the heald shafts, is located another closed casing 58 inside which are carried transmission pulleys 59 engaging the further yielding cables 60 which are secured to the lower sections 57b of the heald shafts 57.

Figure 3:
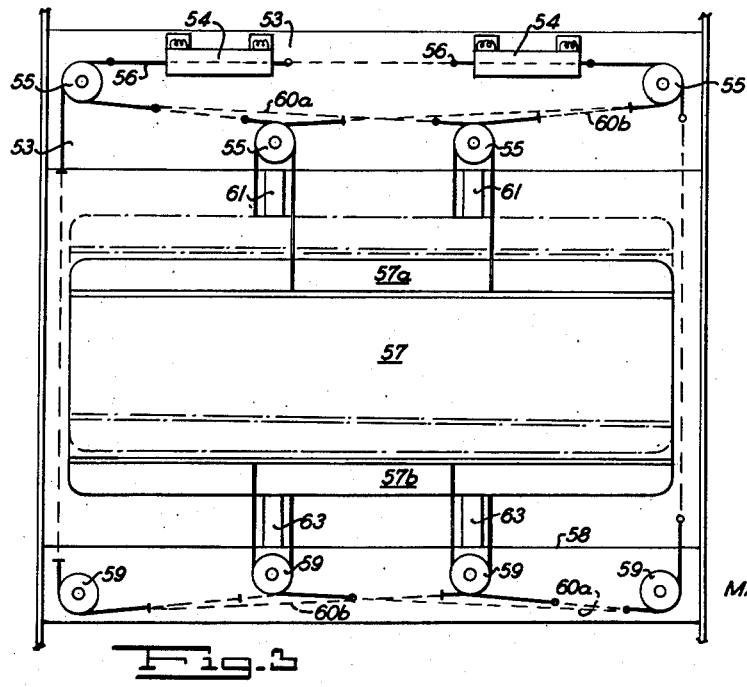
FIG. 3 is a front elevational view illustrating the movement of the heald shafts.

The driving means 54 located to the left-hand side and shown in solid lines in FIG. 3 control the odd heald shafts I, III, V . . ., while their control cables 60a are illustrated in dotted lines.

As to the driving elements located on the right-hand side and shown in thin lines, they actuate the even heald shafts II, IV, VI . . . and their control cables 60b are drawn in dotted lines.

Underneath the upper casing 53 and in registry with the axes of the pulleys 55, are secured stops 61 in the shape of steps, of which the general slope is exactly such that the upper sheets 62 of warp threads are actually located in a common plane, as shown in FIGS. 4 and 5. Similarly, on the lower casing 58 and in registry with the axes of the pulleys 59 are secured stops 63 also of a stepped shape, with a general slope such as will constrain all the lower sheets 64 to lie in a common plane.

The yielding cables 60 pass through the openings provided in the casings, so that said casings are practically proof against dust and fluff.

Outside the frame body (FIG. 1) are secured the shuttle boxes 65, of which the threshold opening lies at the level of and along the slope of the shuttle race, while their rear walls are in alignment with the rearmost position of the reed.

Underneath each shuttle box 65 and in the plane described by the picking stick 6 is secured a damper for the latter, of a conventional type, or else, a damping system 25 constituted by a cylinder inside which a piston is adapted to move under the action of the picking stick. When the picking stick 6 arrives at full speed, almost at the end of its stroke, it impinges against said piston which subjects the air to a gradually increasing pressure, so that, whatever may be the energy to be dissipated, the piston never reaches the bottom of its allowed travel. Said piston may be returned into its original position, either by a spring, or by the pressure of a compressed fluid.

At the outer end of each shuttle box (FIG. 1) is secured a pneumatic and hydraulic damping system 66 of any desired type, ensuring the damping of the shuttle movement slightly before the end of its travel and adapted to dissipate entirely the remaining energy of said shuttle.

As a modification illustrated in FIG. 6, it is possible to dissipate the energy of the shuttle as it reaches the end of its travel by braking it through the agency of a tongue 67 urged by pusher members 68 subjected to the action of adjustable springs after which, slightly before the end of the shuttle stroke, the shuttle is braked furthermore by the picker 8 subjected to the pressure of an also adjustable push member 69 identical with the above-mentioned push member 68.

The shuttle, when it starts, should be entirely free of any braking action, so that the push members 68 and 69 are urged back by the compressed fluid passing out of the driving means 70 which provide for the starting of the shuttle. Said fluid acts on the push members just before the starting of the shuttle.

The shuttle 7 is subjected to no restriction by the sheets of warp threads or by the reed, which are perfectly stationary during the passage of the shuttle from one shuttle box to the other and it may be guided with a clearance reduced to a minimum inside its boxes. The same is the case for the picker 8 and the picking stick 6.

The cross-section shown in FIG. 7 illustrates the manner of operating, without any substantial clearance at 22, of said three members: the shuttle 7, the picker 8 and the stick 6.

The damping of the reed carrier at the rear end of its stroke and its accurate positioning in alignment with the shuttle boxes, are ensured at each side of the loom frame as shown in FIG. 2 by:

A pneumatic and hydraulic damper 27 of a conventional type, secured to the frame, A mechanical brake 28 secured to the frame and released also pneumatically, A mechanical bolt 29 also secured to the frame and also released pneumatically.

The brake 28 is illustrated in detail in FIG. 8. A piston 71 is secured to the frame 2 and over said piston a cylinder 72 is adapted to slide by a maximum length c, said cylinder being fitted inside another cylinder 73 also rigid with the frame body.

The damping to the front of the reed carrier is ensured on either side by a pneumatic and hydraulic damping system 30 (FIG. 2) of a conventional type (FIG. 2) or else, by a stationary stop which is not illustrated.

A screwed-on cap 74 (FIG. 8) forms a transverse stop for the piston 72 and also ensures the adjustment (regulation) of the penetration of the piston 72 and also ensures the adjustment (regulation) of the shoe 76 similar to another shoe 78 secured to the cylinder 72.

Axially of the piston 71, a compressed fluid is fed through the channel 77, so as to urge the cylinder 72 against the cap 74.

Figure 9:
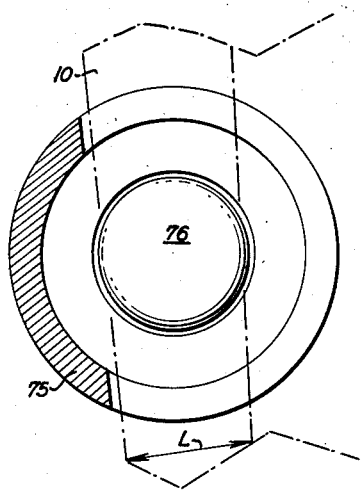
FIG. 9 is an elevational side view corresponding to FIG. 8.

When the strut 10 carrying the reed carrier engages the space between the shoes 76 and 78, it is slowed down until its stops during its travel L (FIG. 9).

Figure 10:
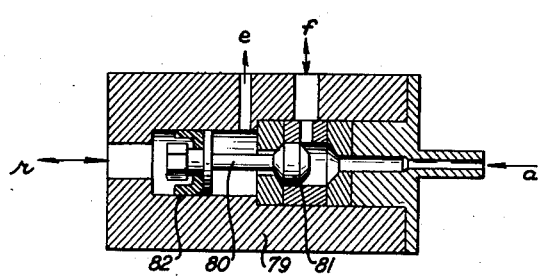
FIG. 10 illustrates the relay actuating the brake cooperating with one side of the reed carrier.

It is sufficient, at the moment of the starting of the reed carrier, to connect the fluid-carrying chamber with the atmosphere, in order that the brake may immediately cease operating. This is ensured by a differential relay (FIG. 10) which includes a cylinder 79 inside which moves a double piston 80 of which the head 81 forms both a valve and a piston.

The port $a$ is connected with a channel ensuring a permanent pressure to the rear of the head 81. The port $r'$ is connected with the cylinder of the driving means 36 for the reed carrier, which are alternatingly subjected to pressure and connected with the atmosphere. The port $f$ is connected with the brake 28 and the port $e$ is open to the atmosphere. When the reed carrier is in its rearmost stationary position, the head 81 is urged back and the compressed fluid feeds the brake which clamps the shoes together.

At the moment of the starting of the reed carrier, the compressed fluid starting from the cylinder of the driving means 36, reaches also under a piston 82, of which the cross-section is larger than that of the head 81, whereby, under the action of the difference in pressure prevailing on the two sides of the piston, the head is urged back in opposite direction and closes the port $a$ and simultaneously connects the ports $f$ and $e$ together, so that the pressure exerted by the brake is cut out.

The cylinder controlling the reed carrier is not fed for some time before the reed carrier returns towards its starting position and, when the strut 10 reaches a position between the shoes 76 and 78 (FIG. 8), the pressure is already exerted on the shoe 78.

Figure 11:
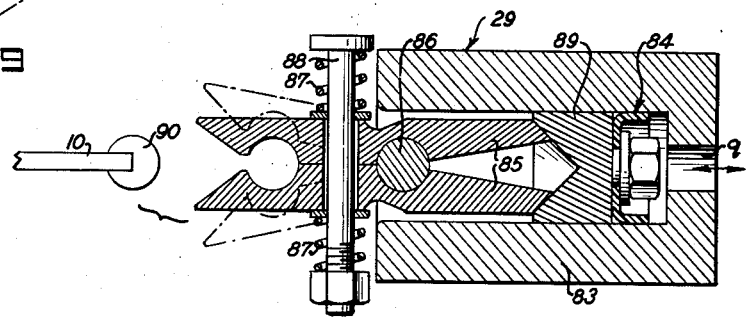
FIG. 11 is a view from above of the bolt locking one of the sides of the reed carrier.

The mechanical bolt 29 is illustrated in detail in FIG. 11. A cylinder 83 is secured inside each frame section in registry with the strut 10. It carries at the bottom of the chamber formed by it, a fluid-tight piston 84 rigid with a metal piston 89 provided with an outwardly flaring V-shaped opening.

At the inlet into the cylinder are housed two identical jaws 85 pivotally secured to a spindle 86 and urged towards each other by springs 87 engaging to either side the stops formed by the head and the screw unit of a spindle 88 and by the nut screwed over the latter.

The ends of the jaws housed inside the cylinder move apart under the action of springs and engage the piston 89 to urge the latter rearwardly, while the other ends of the jaws close and their cooperating notched surfaces form together a slightly open cylinder and a V-shaped input dihedral.

When the strut 10 to which is secured a bolt 90 in the shape of a solid cylinder, reaches a position near the end of its travel, said bolt meets first the slopes formed by the dihedral on the jaws and space the latter apart so that it is clamped exactly when it reaches the end of its stroke, by the closing of the jaws, which are urged back by the springs, whereby the reed carrier is locked in position throughout the duration of travel of the shuttle.

Upon starting of the next movement of the reed carrier, the compressed fluid from the cylinder associated with the piston in the means 36 driving the reed carrier, passes through the port $q$ in the cylinder 83, so as to urge the pistons 84 and 89 back. The V-shaped end of the piston 89 provides for the closing of the ends of the jaws on the cylinder side, so that said jaws open on the side facing the strut and release the bolt 90.

The roll of fabric 91 (FIG. 2) is carried by two levers 92 which are rigidly secured together and are pivotally carried by studs 93, each of which is carried inside the frame.

At the other end of each of said levers 92, a return spring 94 provides a substantially constant pressure between the roll 91 and the winding roll 95. As the roll 91 increases in size, its weight also increases, but the return springs associated therewith ensure a resistance which is proportionally larger.

To the end of each lever 92 on the side corresponding to the return springs, there is secured the rod 96 of a piston moving inside a cylinder 97 secured to the corresponding frame section. A hand-controlled valve 98 connects the cylinders with the atmosphere throughout the winding of a piece of fabric over the roll 91.

When it is desired to release said roll which carries a more or less considerable amount of fabric, it is sufficient to operate the valve 98. The compressed fluid reaches a position underneath the pistons in the cylinders 97 which raise the levers 92, so that the needles on the fabric roll are laid over the removable slopes 99 which are fitted transiently in locations provided therefor in the same sections, while they may assume, at their ends, the shape illustrated at 100 or at 101.

As a modification, the roll 91 may be caused to sink directly into a carriage which is shifted into a position between the sections 1 and 2 of the frame, just underneath said roll 91, since, as illustrated in FIGS. 1 and 2, the space extending underneath said roller and down to ground, is entirely free.

The positioning of an empty roll is performed by hand, after removal of the two slopes 99 and mere reverse operation of the valve 98.

The weaving loom is provided with a supply of compressed fluid such as compressed air, connected with the different pneumatic driving means which are in their turn controlled by electromagnets connected with miniature switches.

The weaving loom is also equipped with conventional control means such as stop knobs and starting knobs located preferably to either side of the loom, an electric weft motion and warp protector, means detecting the presence of the shuttle in the shuttle boxes and a switch controlled by the batten.

In the following disclosure, the reference numbers defining the parts cooperating with the left-hand side of the loom carry the index G and those corresponding to the right hand side the index D.

Figure 12:
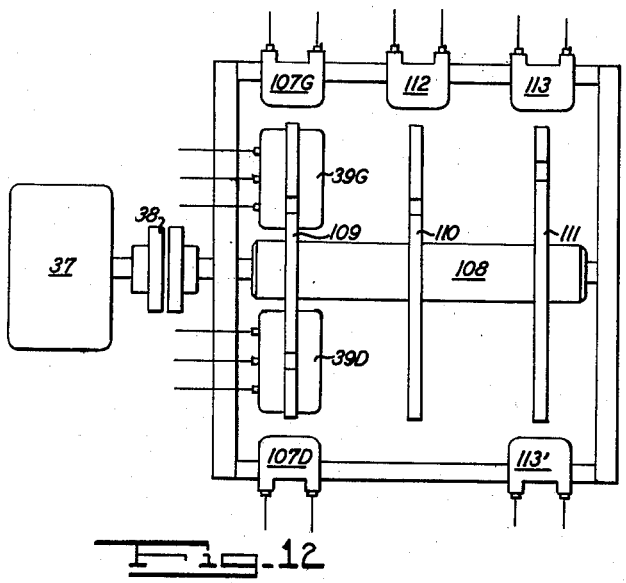
FIG. 12 illustrates the electric distributor with its cams and miniature switches.

The rhythm of the different movements is obtained by a timing distributor illustrated diagrammatically in FIG. 12. Said distributor includes a miniature motor 37 rotating at a low speed and driving, through the agency of an electric clutch 38, a cam shaft 108 carrying:

A cam 109 playing two parts, to wit: firstly, it provides for the starting of the shuttle towards the right and towards the left-hand side, through the agency of the miniature switches 107G and 107D, which release alternately the action of the corresponding driving means 70 and, on the other hand, it detects at the desired moment the presence of the shuttle in the left-hand or right-hand shuttle box, through the agency of the miniature switches 39G and 39D which switch off, if required, the control circuit.

A cam 110 acting on a miniature switch 112 controlling the two driving means 36 of the reed carrier, A third cam 111 actuating the miniature switches 113 and 113' energizing the driving means 54 controlling the heald shafts 57.

A rotation of the cam shaft 108 produces 8, 10, 12 or more complete cycles and, for instance, for 8 cycles, the cam 109 is provided with four notches. The miniature switches 107G and 107D being arranged at 45° with reference to each other, the result is that, for one cycle out of two, each of said switches is closed alternately so as to start the shuttle towards the right-hand side and towards the left-hand side respectively.

The same is the case for the miniature switches 39D and 39G, which ensure the stopping of the loom in the case of absence or lag of the shuttle on the right-hand side or left-hand side or in case the warp breaks.

For this 8 cycle operation, the cam 110 is provided with 8 notches which, at each passage, actuate the miniature switch 112 controlling the driving means for the reed carrier.

As concerns the heald shafts, the corresponding cam 111 is provided with two notches which actuate in succession the miniature switches 113 and 113'. The number of notches and miniature switches depends on the weave to be produced and on the number of heald shafts.

Figure 13:
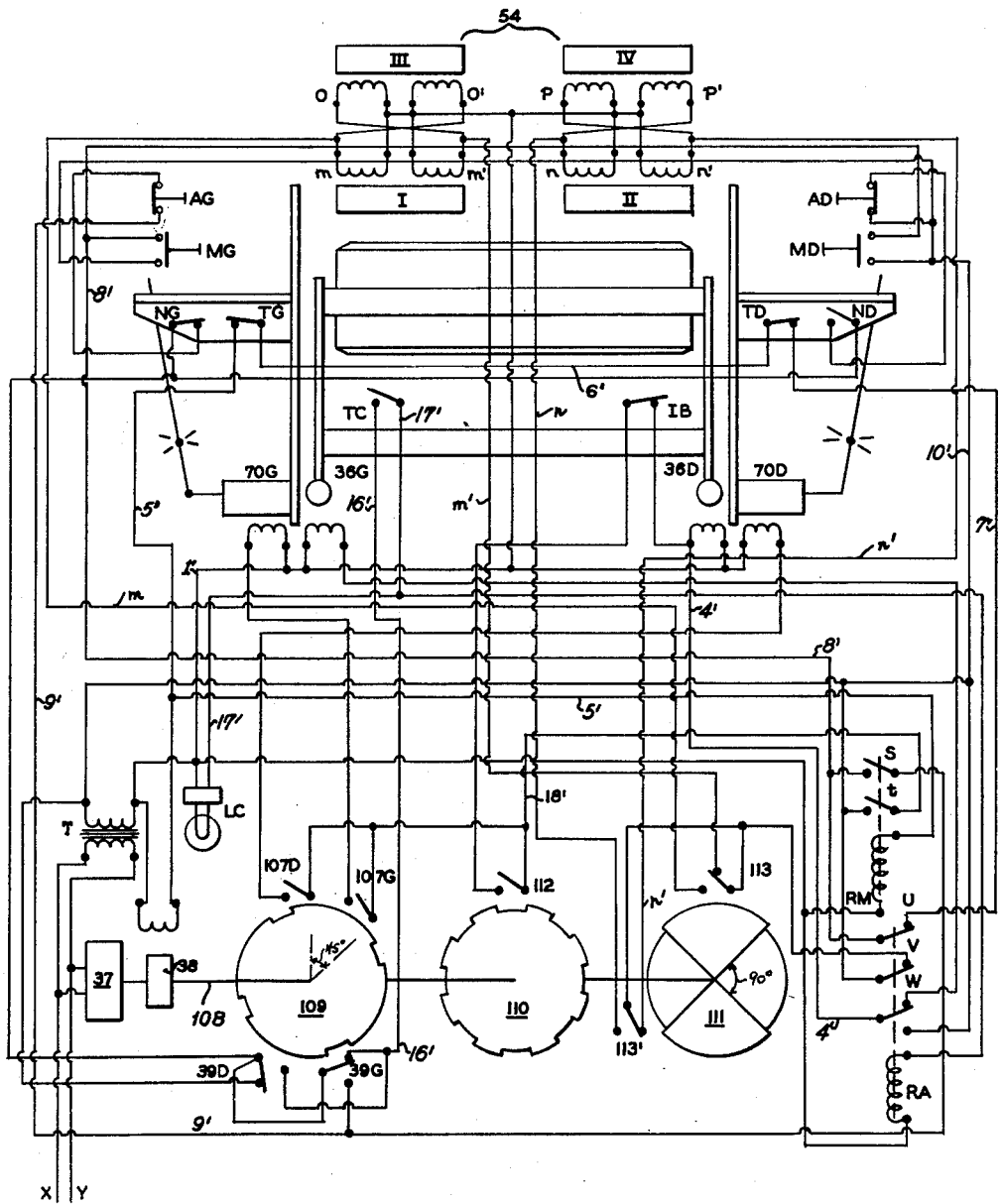
FIG. 13 is a general wiring diagram.

FIG. 13 is a complete wiring diagram showing the different electric parts ensuring the successive operations of the loom in the case of a connection which provides for the control of the heald shafts for a worsted weave 2/2 taken by way of example.

In the wiring diagram, MG and MD designate the switches controlling the left-hand and right-hand operation, AG and AD the stop switches, NG and ND the shuttle feeler switches operating inside the boxes, TG and TD the weft feeler switches, TC the warp feeler switch, IB the switch controlling the reed carrier, 70G and 70D the driving means for the picker associated with the miniature switches 107G and 107D, 36G and 36D the driving means for the reed carrier controlled by the miniature switch 112, the driving means 54 for the heald shafts (the number of which is equal to four as illustrated at I, II, III, IV), which driving means are controlled by the miniature switches 113 and 113', a transformer T, a witness lamp Lc for the warp feeler, a starting relay RM, a stop relay RA. The terminals of the windings associated with the driving means for the heald shafts are designated respectively by m–m', n–n', o–o', and p–p'. X designates the first phase of an alternating electric current and Y designates the second phase.

In the particular example illustrated, the cam 111 is provided with two hollow recesses extending over 90° and two projections extending also over 90°.

The miniature cam operated switch 113 controls the rise of the first heald shaft at m or the lowering of said heald at m', while the miniature cam operated switch 113' controls the rise of the second heald at n or the sinking of said heald at n'. Said miniature switches are shifted by 45° with reference to each other.

The third heald shaft operates in the same manner as the first heald shaft, but in the reverse direction by reason of the connection between m and o' and between m' and o.

The fourth heald shaft does the same work as the second one but in reverse direction, by reason of the particular connection between n and p' and between n' and p.

There is thus obtained twice the weave ratio of worsted material during one revolution of the cam 111.

According to the shape given to the cam 111 and to the connection of the windings of the heald shaft driving means, it is possible to obtain various simple weaves, as will be readily understood.

The diagram shown in FIG. 13 is subdivided into two sections and the reference numbers in the upper part correspond to similar reference numbers in the lower part, so as to show symbolically the connections which are not actually illustrated.

In said diagram, the apparatus are illustrated as inoperative, the loom being stopped. The shuttle is on the left-hand side, the means detecting the presence of the shuttle NG is closed, 39D is raised, 39G is lowered and ND is open, there being no blade TC closing 17' and 16', while the contact blades of the relay RA are closed and the reed carrier is in its rearmost position, so that switch IB is closed; the miniature switch TG is closed by reason of the absence of a shuttle and the switch TG is closed by the presence of the weft on the left-hand side.

The contact of switch 113' is lowered and the contact of switch 113 is raised. They close m' and n'. The windings m' and o as well as n' and p are fed, the heald shaft I and II are lowered, while III and IV are raised, while miniature switches starting the shuttle, 107G and 107D, are open, as also the switch 112 starting the reed carrier.

Upon depressing one of the two knobs MG or MD, there is obtained on electric connection 10' of the transformer and 8' of Md or MG with 8' of U, 7' of TD, 6' of TG, 5' of winding RM, 5' of 38, and 1' of the transformer.

The circuits of RM and of 38 being closed, 38 engages the cam shaft 108, and the blades s and t of the relay RM close 9' and 8' as well as 10' and 18'. While the loom begins operation, the circuit of RM is kept closed when the shuttle reaches its left-hand box and its right-hand box and the cam 109 closes first through ND and 39G, then through NG and 39D, the circuit passing through the corresponding stop knobs AG and AD; the connections are however such that the left-hand stop knob AG can stop the loom only when the shuttle reaches its left-hand box and the stop knob on the right-hand side AD can stop the loom only when the shuttle reaches its right-hand box. The same is the case of the means detecting the presence of the weft, the miniature switches TG and TD stopping the loom only when the shuttle reaches its left or right-hand box respectively.

In order to adjust the energy of insertion of the pick according to the weave of the fabric, the switch IB, illustrated at 117 in FIG. 2, is adjustable and secured to the inside of one of the frame sections and it is opened with a more or less considerable lag by engagement with a sloping member 119 secured to one of the struts 10 forming the reed carrier, whereby the electric supply controls during a more or less considerable time the feed of compressed fluid into the driving means provided for the reed carrier, which leads to a more or less energetic impulse to the reed for the insertion of the pick.

If a warp thread breaks, the corresponding heald shaft drops and closes the switch TC so as to produce a stoppage of the loom through a closing of the circuit feeding the relay winding RA and illuminating the witness lamp LC. In this case again, the stoppage is obtained only upon the shuttle reaching its left-hand or right-hand box and through the agency of the switch 39D or 39G respectively.

The three contact blades controlled by the relay RA open as follows:

The first u switches off the operative circuit of the loom and stops the latter;

The second blade v switches off the feed of the heald shafts and releases them entirely, so that they may be returned readily by hand into a same plane, and allow the operator to find which warp thread is broken and insert it into the corresponding heald shaft after repair;

The third blade w switches off the feed of the winding 36G of the left-hand driving means for the reed carrier, while said same third blade connects the wires 4' and 10', so as to feed thus the winding 36D of the right-hand driving means for the reed carrier which is held in equilibrium between its return spring 26 (FIG. 2) and the force applied to it in the opposite direction by the right-hand driving means and may thus be brought by hand into the position which is the most suitable for an easy passage of the repaired thread through the reed.

The detection by the operator of the cause of the stoppage is therefore an easy matter.

But, in addition thereto and in order to avoid any blindfold restarting, in the case of the absence of a weft thread or of the breaking of a warp thread, or even in the case of a lack of tensioning of one of the warp threads, it is not possible, while RA, TD or TG is open, to restart the loom through operation of a starting knob MG or MD.

It is also possible to incorporate with the loom a third electric control knob at each control station, on the one hand, in order to rotate the miniature motor 37 controlling the distributor in the opposite direction and, on the other hand, to close the circuit of the clutch 38 by switching off RM, whereby only the heald shaft timing means are operative, which allows unweaving, pick by pick, while leaving the reed carrier and the shuttle in a stationary position.

Hereinafter are described the preferred embodiments of the driving means 54, 70 and 36.

Figure 14:
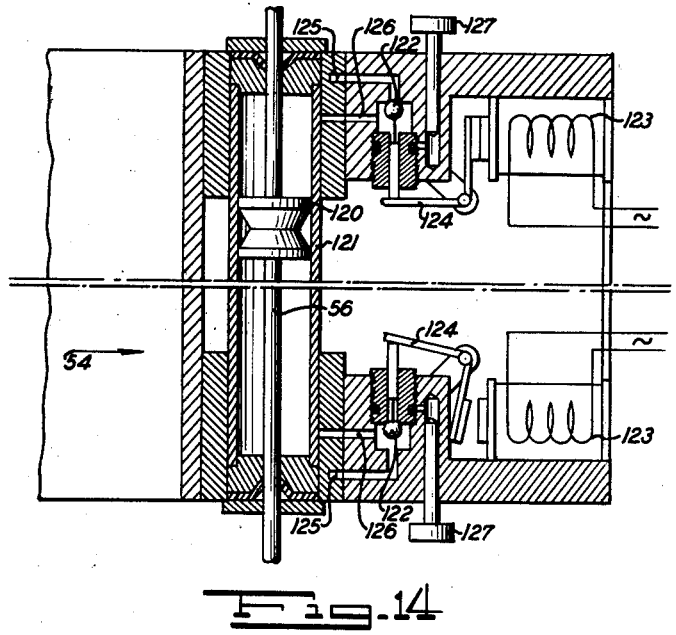
FIG. 14 is an axial sectional view of an embodiment of the driving means for a heald shaft.

FIG. 14 illustrates in detail the driving means 54 controlling one of the heald shafts 57. Each heald shaft is actuated by a double-acting position moving inside a cylinder 121, for which the admission and exhaust are operated alternately to either side of the piston in accordance with a rhythm controlled by the distributor cam 111.

Each of the two ends of the cylinder 121 carries a valve 122 actuated by an electromagnet 123 through the agency of a square-shaped lever 124. The electric connections for the two electromagnets are such that the closing of the circuits for one of said electromagnets corresponds to the simultaneous breaking of the circuit of the other electromagnet. Thus, each miniature switch 113–113' of the timing distributor produces, in one direction of operation, the rise of the heald shaft and, in the other direction, the lowering of said same heald shaft.

Compressed fluid is fed permanently into the channels 125 and, if the valve 122 is not urged forwardly by the electromagnet 123, the fluid holds it in position, so as to close the exhaust and, as it passes through the channel 126, said fluid enters the cylinder and urges the piston forwardly.

When the circuit of one electromagnet winding is closed, the corresponding valve is urged forwardly and closes the admission at 125 and at the same time it opens the exhaust, which latter is adjusted by a needle valve 127. Since, at the same time, the opposite electromagnet winding has its circuit open, the piston is urged rearwardly into its opposite position.

An adjustment of the exhaust opening at each end of the cylinder allows adjusting the speed of rising or lowering of each heald shaft by reducing more or less considerably the cross section of the exhaust opening.

Through an angular shifting of the cam 111 with reference to the shaft 108 of the timing distributor (FIG. 13), it is possible to cross the heald shafts more or less early with reference to the cam 110 and hence, with reference to the impact of the reed against the fabric.

Figure 15:
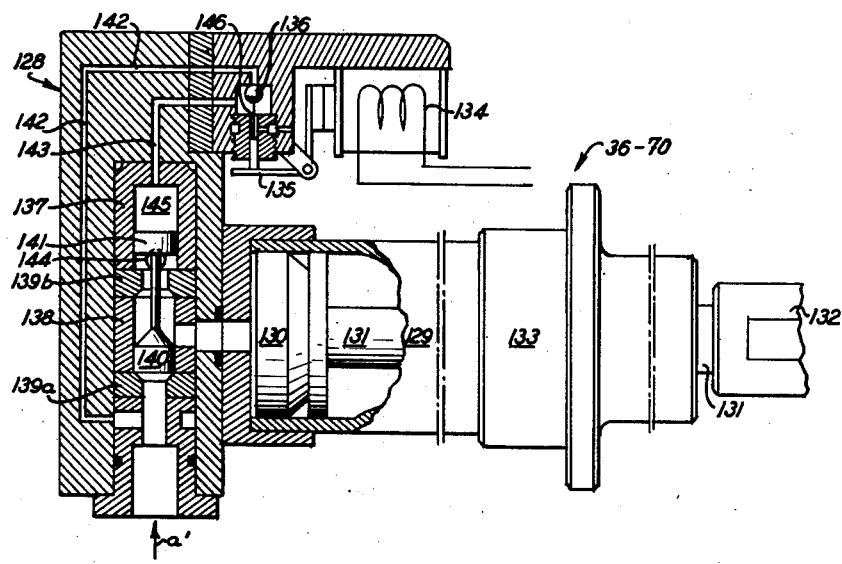
FIG. 15 illustrates cross-sectionally driving means suitable both for the starting of the shuttle and for the drive of the reed carrier.

FIG. 15 shows in detail both the driving means 70 starting the shuttle and the driving means 36 starting the reed carrier, since these two driving means are similar.

Each of these driving elements includes:
A head 128 which is pivotally secured to the frame and carries the whole system, whereas the other side is carried by the picking stick 6 or the strut 10, as the case may be;
A cylinder 129;
A single-action piston 130;
A piston rod 131 with its strap 132;
A cap 133 holding the cylinder 129 against the head 128 by means of bolts which are not illustrated.

The head 128 is provided with:
An electromagnetic winding 134;
A square-shaped lever 135;
A valve 136;
A differential pneumatic relay including a cylinder 137, another cylinder 138, two closing seats 139a and 139b, a double piston, of which one head 140 forms both the valve and one piston and the cross-section of which is smaller than that of the opposite head 141 cooperating with the cylinder 137;
Two channels 142 and 143.

The compressed air flows permanently at $a'$ and has a tendency to urge back the head 140, but it is also admitted through 142 onto the valve 136, so as to urge the latter back and to close the exhaust 146, which allows said compressed air to reach through the channel 143 the piston head 141. This difference in cross-section between the piston heads 140 and 141 is such that the seat 139a is closed while, simultaneously, the seat 139b is released and connects the cylinder 129 with the atmosphere through the exhaust port 144, whereby the piston 130, subjected to pressure on its other side, returns into its position at the bottom of the cylinder 129.

When the circuit feeding the winding 134 is closed (as in the case in FIG. 15), the square-shaped lever 135 raises the valve 136 which closes the admission of air through the channel 142, opens the exhaust at 146 and sets the chamber 145 in connection with the atmosphere. The drop in pressure in said chamber 145 makes the pressure exerted on the head 140 predominant, so that the piston 140–141 is driven upwardly, closes 139b and allows the compressed air to enter the cylinder 129.

As soon as the circuit feeding the winding 134 is broken, the reverse operation is obtained.

The electromechanical control system described hereinabove and illustrated in the lower part of FIG. 13, may advantageously be replaced by a purely static electronic control system. Said electronic control system illustrated in FIG. 16 includes essentially:

A clock or oscillator 151 which generates a rectangular wave, of which the adjustable frequency defines the rhythm or speed of operation of the loom.

A cyclic programmer 152 which sends orders at time intervals which are multiples of the period of oscillation of the oscillator. It includes a counter, of which the capacity is equal to $n$ unities, say 256 units and circuits which allow obtaining coincidence between an indicated or exposed value and the contents of the counter, the order being given when said coincidence is obtained.

Memories "OFF" and "ON" 153, 154, 155, of which each input $E'_1, \ldots E'_8$, may be connected by the pins (or: plugs) $E'$ to $E8'$ with any one of the 256 points of the programmer 152, so that the beginning and the end of each impulse at the outputs SB, SCD, SCG, may be adjusted for the proper operation of the loom.

The output SB is connected with the driving means controlling the reed-carrier, 36G and 36D through the intermediary of a logical element "OR" 171 and of a power amplifier 159.

The output SCD is connected with the driving means 70D starting the shuttle on the right-hand side.

The output SCG is connected with the driving means 70G for the starting of the shuttle on the left-hand side (FIG. 13), said connections being performed with the insertion of power amplifiers 159a.

A cyclic programmer 156 controlling the heald shafts, of which the inputs E9 and E10 depend, for one direction of operation, on the rhythm of the programmer 152 by the pins (plugs) $E'_9$ and $E'_{10}$ while its input E11 is controlled in the reverse direction by an unweaving knob BD, by the memory 173 and the outputs of said cyclic programmer $C1, \ldots C4$, for instance, but which may be increased so as to include $C1, Cn$ and receive in succession a pip once per cycle of operation of the doom or for each pick.

A series of switches 157, of which the different operative combinations allow obtaining as desired and very speedily any desired fabric weave, within the limits allowed by the number of heald shafts, and the number of picks for which the programmer 156 is designed.

A series of logical "OR" elements 158, of which the inputs are controlled by the groups of switches 157, while their outputs feed the driving means for the heald shafts through the agency of the logical "AND" elements 167 and of the power amplifiers 159b.

A series of logical "AND," "OR," "NO" and memory elements, of which the connections are associated together and with the different points controlling operation, starting, stoppage and safety, corresponding to the ends of the shuttle and reed carrier travels and also with the means detecting the presence of the weft and warp threads and the like.

The clock 151 feeds the programmer 152 through the "AND" circuit 160, but, in order that the programmer may begin operating, it is necessary furthermore that this "AND" circuit 160 may be fed in its turn through its second input. Said second input is governed by the output of a memory 161 which can be energized only through the output of an "AND" circuit 162. In order that the "AND" circuit output 162 may be fed, it is necessary, on the one hand, for the four inputs of said "AND" circuit 162 to be simultaneously operative (EP-zeroized programmer, CN-shuttle in position on the proper side, CB-reed carried in its rearmost position, BM-order given for the starting) and, on the other hand, it is necessary for an "AND" circuit 163 to have received no countermand for one of the possible causes of stoppage, failing which the memory 161 will not be energized and the "AND" circuit 160 will not be fed.

Continuous operation is ensured as long as the memory 161 remains energized.

The stoppage of the loom is operated by one of the main stopping safeties feeding the logical "OR" circuit 164: stop knob BA, warp protector CC, weft fork CT, absence or non-arrival of the shuttle at the desired moment N into its shuttle box, as detected by a circuit "NO" 168 which feeds an "AND" circuit 166. It is however possible to associate further stopping safeties such as a weft feeler, an automatic shuttle changer or an automatic cop changer upon stoppage, etc. . . . It is also possible to provide the automatic stoppage of the frame through FC when the frame has woven a predetermined length of the fabric, as recorded by a pick counter.

The non-arrival of the reed carrier into its rearmost position at the desired moment CB commands also the stoppage, but in an indirect manner. This non-arrival is detected by a "NO" circuit 174 which deenergizes the memories 154 or 155 and prevents the shuttle from starting and, consequently, from reaching the other side, as will be detected by the "NO" circuit 168.

The stoppage of the loom is allowed by the "OR" circuit 164 of which the sole output feeds a memory 165, while the output of said memory 165 feeds the second input of the "AND" circuit 163. The output of said "AND" circuit 163 cuts out the memory 161, of which the output feeds no longer the "AND" circuit 160, so that the output of said "AND" circuit 160 no longer feeds the programmer 152. However, the sequence of said operations depends on tht second input of the "AND" circuit 163 associated with the zero of the programmer 152.

The action of an "OR" circuit 164 is delayed by the memorization at 165 and the coincidence at 163, so that the stoppage of the loom is actually obtained only when the programmer passes through zero, that is after the actual or assumed arrival of the shuttle into its box.

The stoppage through the safety CC corresponding to the warp protector leads simultaneously to the energization of only one of the driving means for the reed carrier 36D and the switching off of all the driving means for the heald shafts, as disclosed hereinabove in the description of the operation of the loom, through the energization of a memory 169 feeding an "AND" circuit 170, of which the second input depends on the zero of the programmer 152. The output of the "AND" circuit 170 feeds, on the one hand, an "OR" circuit 171 and, consequently the single driving means 36D of the reed carrier and, on the other hand, a "NO" circuit 172 which switches off the second input of all the "AND" circuits 167 of the driving means for the heald shafts. The reed carrier is released, since it is in equilibrium between its return spring 26 and the action of the driving means 36D (FIG. 2). The restarting through the knob BM which deenergizes the memory 169 can be obtained only when the repaired thread has been correctly tensioned, the reed carrier and the heald shafts having then returned to their normal positions.

The stepwise unweaving is obtained through a knob BD which energizes a memory 173. The output of said memory 173 deenergizes, on the one hand, the memory 161 which can thus no longer receive any order from the "AND" circuit 162 and, on the other hand, it deenergizes the memories 153, 154 and 155 through EII and at the same time, it feeds the cyclic programmer 156 in the opposite direction, but only for one pick of the frame, whereby each impulse given by the knob BD produces the movement of the heald shafts in the opposite direction for each successive pick, without the driving elements acting on the picking stick and on the reed carrier being operative.

Each main safety stopping means produces simultaneously with the stoppage of the loom, the illumination of one of the witness lamp, i, j, k, l, the colors of which are different according to the cause of the stoppage, which has energized them, or else, the illumination of a luminous signal carrying an indication as to the cause of stoppage. The detection of this cause by the operator is thus speedy and reliable.

The detection of the shuttle at its arrival into a box or of its presence inside the box by the "NO" circuit 168 may be obtained through miniature switches, as disclosed hereinabove in the description of the electromechanical control system, or else, by means of photo-cells, of photo-transistors associated with luminous sources, or again, by proximity switches and the like.

What I claim is:

1. A loom comprising heald shaft elements, warp threads being raised and lowered by said heald shaft elements in a shed arrangement, a reciprocating shuttle element, a weft thread being inserted into the shed the warp threads by said reciprocating shuttle element, a reed-carrier element beating up the weft thread, pistons operatively associated with said heald shaft elements, reciprocating shuttle element and reed-carrier element, electro-pneumatic valves operatively associated with said pistons, the movements of said heald shaft elements, shuttle and reed carrier elements being obtained pneumatically by a fluid under pressure acting on said pistons, under control of said electro-pneumatic valves, and a static electronic control means regulating the movements of said heald shaft elements, shuttle and reed-carrier elements through a repeated sequence of steps and comprising a distributor coupled to said valves and ensuring rigorous rhythm of said elements and causing starting of each of the movements of said respective heald shaft elements, shuttle and reed-carrier elements at predetermined precise times which are independent of the completion of the preceding movements, said means including further means establishing time intervals between two sucessive movements of respective of said elements to control the end of movements of said elements and the stopping of said control means, which then prevents the next successive sequence of steps from taking place if one of the movements in the preceding sequence fails to be completed in the allotted time.

2. A loom according to claim 1, wherein the means establishing time intervals in constituted by a static electronic device comprising timing means producing a rectangular wave, having a frequency which determines the working rhythm, a cyclic programmer feeding information at itmes which are multiples of the period of the timing means, and electronic circuit means for carrying out conventional logical functions.

3. A loom according to claim 2 wherein said electronic device comprises a further auxiliary cyclic programmer for the control of the heald shaft elements for varying the weave of cloth by a simple change of connections.

4. A loom according to claim 3 wherein the auxiliary cyclic programmer for the control of the heald shaft elements is adapted to operate in a normal direction in a direction opposite to said normal direction and thus to obtain throw-by-throw unweaving by actuating the heald shaft elements only.

5. A loom according to claim 3, comprising safety control devices constituted by electrical means actuated by the shuttle element and the auxiliary means, said electrical means including contacts respectively associated, to selectively instantaneously stop the loom in a position in which the reed carrier element is immobilied at the rear in alignment with the shuttle boxes and the warp threads open at the pitch of the shed, through which the shuttle element has just passed, and to stop the loom in a position in which the heald shaft elements are inoperative and the reed carrier is to the front.

6. A loom according to claim 3, comprising stops casings for said heald shaft elements, elastic cables controlling said casings to ensure that said casings are held fast, both in raised and lowered position against said stops, said stops being in the shape of steps such that the upper and lower sheets of warp threads are respectively located in the same plane.

References Cited by the Examiner

UNITED STATES PATENTS

| | | | |
|---|---|---|---|
| 924,142 | 6/09 | Burrows | 139—11 |
| 2,146,611 | 2/39 | Young | 139—1 |
| 2,324,221 | 7/43 | Luhn | 66—155 X |

(Other references on following page)

| | | | |
|---|---|---|---|
| 2,377,800 | 6/45 | Mascarenhas | 139—11 |
| 2,649,118 | 8/53 | Heath | 139—144 |
| 2,810,402 | 10/57 | Godschalx | 139—1 |
| 2,865,404 | 12/58 | Mascarenhas | 139—144 X |
| 2,886,243 | 5/59 | Sprague et al. | 235—150 |
| 3,089,322 | 5/63 | Bruce et al. | 66—154 |
| 3,117,598 | 1/64 | Burkhalter | 139—319 |

FOREIGN PATENTS 1,214,873  11/59  France.
1,232,953  5/60  France.

DONALD W. PARKER, *Primary Examiner.*

MERVIN STEIN, *Examiner.*

UNITED STATES PATENT OFFICE
CERTIFICATE OF CORRECTION

Patent No. 3,191,633　　　　　　　　　　　　　　　　June 29, 1965

Marius Piot

It is hereby certified that error appears in the above numbered patent requiring correction and that the said Letters Patent should read as corrected below.

Column 14, line 7, for "the", second occurrence, read -- of --.

Signed and sealed this 12th day of April 1966.

(SEAL)
Attest:

ERNEST W. SWIDER　　　　　　　　　　　　　　　　EDWARD J. BRENNER
Attesting Officer　　　　　　　　　　　　　　　　Commissioner of Patents